United States Patent [19]

Petzetakis

[11] 3,953,057

[45] *Apr. 27, 1976

[54] PIPE AND TUBE COUPLING

[76] Inventor: Aristovoulos George Petzetakis, deceased late of Moschaton-Piraeus, Greece, by Irene H. Diapouli; Nicholas G. Petzetakis; Menelaos G. Petzetakis, all of Athens, Greece, executors

[22] Filed: Oct. 9, 1973

[21] Appl. No.: 404,744

[ * ] Notice: The term of this patent subsequent to Dec. 25, 1990 has been disclaimed.

Related U.S. Application Data

[62] Division of Ser. No. 180,299, Sept. 14, 1971, Pat. No. 3,781,041.

[30] Foreign Application Priority Data

| Oct. 31, 1970 | Greece | 44019 |
| Apr. 7, 1971 | Greece | 45136 |
| Apr. 7, 1971 | Greece | 45183 |
| Apr. 7, 1971 | Greece | 45285 |

[52] U.S. Cl................................. 285/67; 285/156
[51] Int. Cl............................................ F16l 17/02
[58] Field of Search ............ 285/325, 67, 103, 326, 285/327, 111, 156, 423, DIG. 16; 403/331, 340, 339

[56] References Cited

UNITED STATES PATENTS

| 283,771 | 8/1883 | Genin | 285/325 |
| 309,444 | 12/1884 | Dunning | 285/327 |
| 954,348 | 4/1910 | Schaefer | 285/326 |
| 2,672,356 | 3/1954 | Crockett | 285/111 X |
| 2,727,460 | 12/1955 | Russell | 285/325 X |
| 2,890,066 | 6/1959 | Kerr | 285/67 |
| 2,950,130 | 8/1960 | Schneider | 285/325 X |
| 3,781,041 | 12/1973 | Petzetakis | 285/325 X |

FOREIGN PATENTS OR APPLICATIONS

| 61,608 | 3/1892 | Germany | 285/325 |

Primary Examiner—Thomas F. Callaghan
Attorney, Agent, or Firm—Karl F. Ross

[57] ABSTRACT

A pipe and tube coupling arrangement in which two coupling members are provided with transversely interfitting formations resisting axial separation and are thereby brought into axial alignment. A sleeve can then be axially shifted over the joint to prevent transverse separation. The coupling members are provided with annular grooves which receive respective sealing glands bearing outwardly upon the sleeve.

4 Claims, 6 Drawing Figures 3,953,057

PIPE AND TUBE COUPLING

CROSS-REFERENCE TO RELATED APPLICATION

This application is a division of application Ser. No. 180,299 filed 14 Sept. 1971 now U.S. Pat. No. 3,781,041.

FIELD OF THE INVENTION

The present invention relates to a pipe and tube coupling and, more particularly, to a rapid-acting, permanent or disconnectable coupling for tubes, pipes, hose and the like and, more particularly, to a simplified, low-cost, high-efficiency coupling for the stated purposes.

BACKGROUND OF THE INVENTION

Pipe, tube and hose couplings of many types have been provided heretofore and a recognition of the problems involved in the design, production and use of such coupling requires a brief review of the several types. Perhaps the most common type of couplings for disconnectable or replaceable purposes is the screw-type coupling in which a pair of threadedly interconnectable members form a union when the nut portion of one is screwed onto the male portion of the other. In this coupling, the axially aligned coupling members may be provided with mutually engaging transverse faces of complementary configuration and the nut may be rotatably mounted on one coupling member and may have an inwardly turned annular flange bearing against an axial shoulder of this coupling member. A simpler connection makes use of a threaded sleeve between a pair of male threaded members, this system having the disadvantage that one of the members must be rotated through several turns at least in order to ensure a proper tight fit. A seal is guaranteed by using so-called taper or pipe threads. These systems have the disadvantage that rotation of one member relative to the other may not always be possible, that threads are highly sensitive to the presence of foreign matter and to damage, that the threads may not be cut accurately in the first instance, and that the stress applied to the threads in the axial direction may strip them. Accordingly, these techniques have not been fully successful for pipes of materials other than metals.

In the flange coupling, two pipe members are axially aligned and may be provided with integral or dismountable flanges which are bridged by screws or bolts securing the pipes in axial alignment. Such systems are prone to damage by transverse stresses, frequently require considerable time for assembly of the joint since a number of threaded members are provided, and may not be suitable for certain materials in which the stress applied to the flange may be sufficient to break it.

Various clamp-type couplings have also been provided heretofore, generally for the rapid connect and disconnect coupling of flexible hose to withstand low or high pressures. This system generally comprises a pair of axially interfitted coupling members and a clamp means for securing them in axial alignment. The clamp means may consist of hook-type members which are deflected upon insertion of one member into the other and re-engage to prevent withdrawal of the two members unless a detent is operated to permit such withdrawal. These systems have the disadvantage of complex construction and are assembled from parts which are not amenable to production by conventional techniques such as molding.

Finally, I may mention wedge-type couplings in which the relative rotation of two parts of a coupling member, by screw thread or cam systems shifts a wedge element axially to clamp against the exterior of an inner member. This system has similar disadvantages to those given above.

In summary, prior-art systems for coupling two pipes, tube or hose sections together, for connecting a tube, pipe or hose section to another fitting, or for joining two fittings have been characterized by problems in resisting transverse stress, in possessing an excessive number of parts, of requiring moving parts which may be readily damaged or not conveniently manufactured, or requiring excessive manipulation, and of being of inordinate complexity. As a consequence, many attempts have been made to modify one or another of these coupling systems to overcome the disadvantages, these attempts being likewise without success.

I may mention specifically the systems which have been generally described above as providing hooks or clips which engage when two members are urged axially together and may be secured by some retaining element or ring thrust over these clips. The hooks cannot withstand significant transverse stress and even when they may be conveniently manufactured from a synthetic resin, are difficult to handle and manipulate. More often than not, such hook-type couplings or couplings provided with axially interengaging formations are difficult to handle.

OBJECTS OF THE INVENTION

It is the principle object of the present invention to provide a coupling system capable of obviating the aforementioned disadvantages and providing a low-cost secure coupling for pipe, tube and hose.

It is a more specific object of the invention to provide a readily assembled and, if desired, disassembled coupling for pipes, tubes and hose which can be inexpensively manufactured from a thermoplastic synthetic resin and nevertheless provide a secure and leakproof junction.

Another object of the invention is to be found in a system of the character described which allows the pipe, tube or hose to be conveniently attached to the coupling members and allows the system to be assembled in a convenient manner.

SUMMARY OF THE INVENTION

These objects and others which will become apparent hereinafter are attained in accordance with the invention by providing a pair of generally cylindrical coupling members with overlapping semicylindrical shell portions, each having a circumferential groove receiving a respective sealing gland, with transversely (radially) interfitting formations resisting axial separation, and a connecting sleeve axially shiftable over the coupling members and retaining same against relative transverse movement sufficient to release the formation. The sealing glands bear outwardly against the inner wall of the sleeve which permits a limited transverse movement of the members which is less than the depth of their radial or transverse interengagement.

More specifically, the locking formations can include an annular or arcuate groove on one of the members, defining a shoulder disposed inwardly of its end and receiving an inwardly projecting cylindrical segmental shoulder of the other coupling member which may be defined by an inwardly open recess or channel lying inwardly of its end. The latter member may thus be formed with an axially projecting cylindrical shell occupying at most a semicylindrical arc and constituting a half-shell for the purposes of this invention. The coupling member may have similar outer diameters and the inwardly extending shoulder may be received snugly in the outwardly open groove to prevent axial movement of the parts. However, each of the members may be provided with a half-shell having an inwardly projecting arcuate shoulder engaging an outwardly open arcuate recess of the other member so that both members overlap. In this case, the two members may be geometrically identical. The latter embodiment has greater resistance to transverse stress and to axial stresses, allows only one configuration of coupling member to be manufactured and simplifies the assembly of the coupling.

Advantageously, one or both of the members may be provided with outwardly projecting stop means engaging the sleeve. Preferably, the sealing rings project outwardly into the path of the sleeve so that they act as a brake for the latter and also to retain the sleeve during assembly of the coupling. The interior of the sleeve may be completely smooth to prevent distortion of the sealing rings and simplify manufacture. In other words, the inner surface of the sleeve lies along a right circular cylinder and has no recesses or projections. The smooth inner surface, moreover, facilitates injection molding or even forming of the sleeve from an extruded section of the tube.

The resulting coupling has been found to be highly advantageous for mobile as well as quasi-stationary pipes and hose, can permit hoses and pipes to be coupled without regard to the configuration of the end member (especially where the end members are identical) and allows all of the parts to be produced economically and conveniently by injection-molding from a synthetic resin. Since all of the assembly tolerances can be compensated by elastic deflection of the sealing ring, they play no significant role in the system of the present invention. The coupling members can be produced easily from thermoplastic synthetic resins and can be connected to the hose or pipe thermal or ultrasonic welding or by an adhesive. The coupling is easy to handle and assemble, allows rapid connection and disconnection and can be of light weight and high resistance to breakage.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
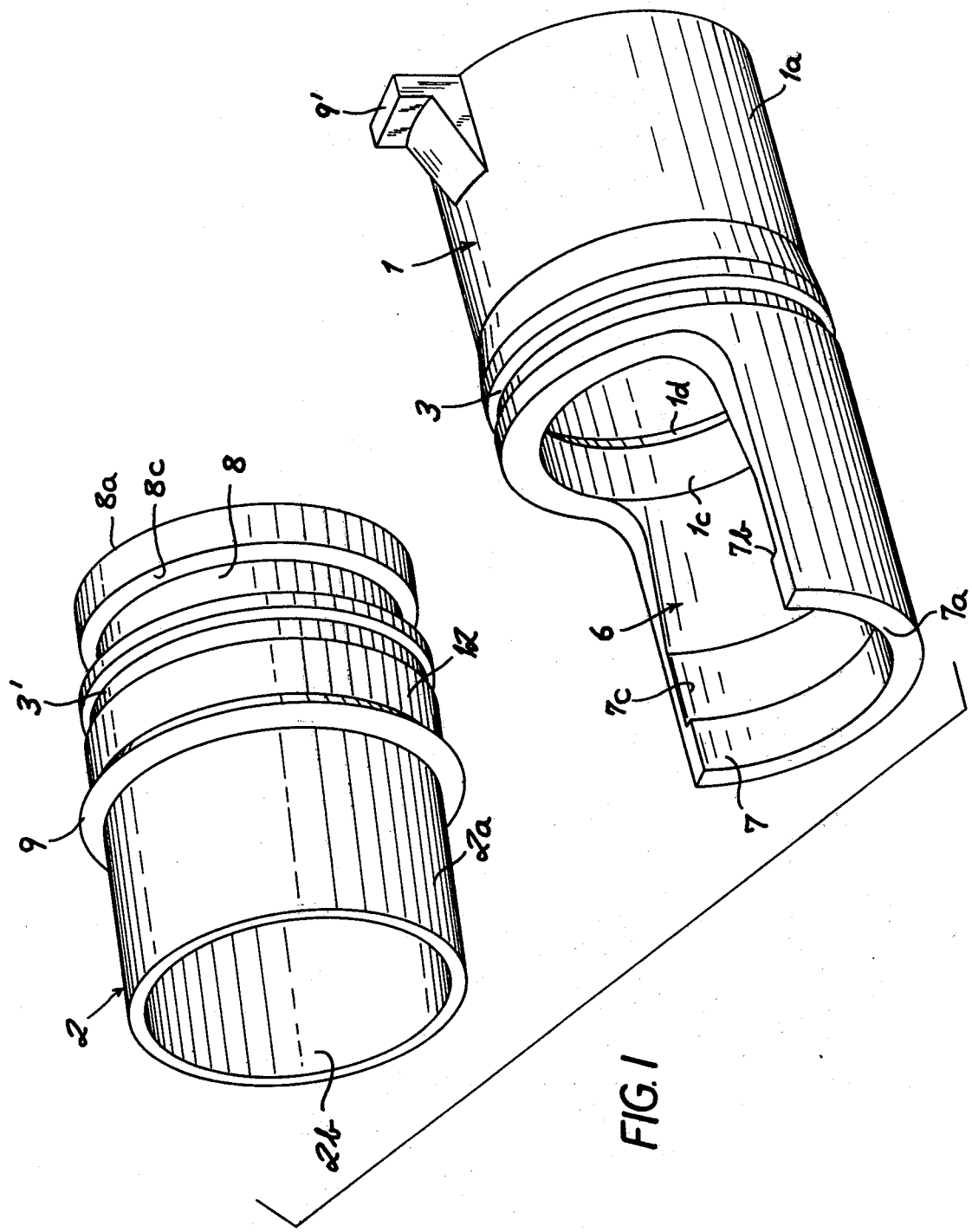
FIG. 1 is an exploded perspective view illustrating the coupling members according to one embodiment of the invention, the retaining sleeve having been removed.
Figure 2:
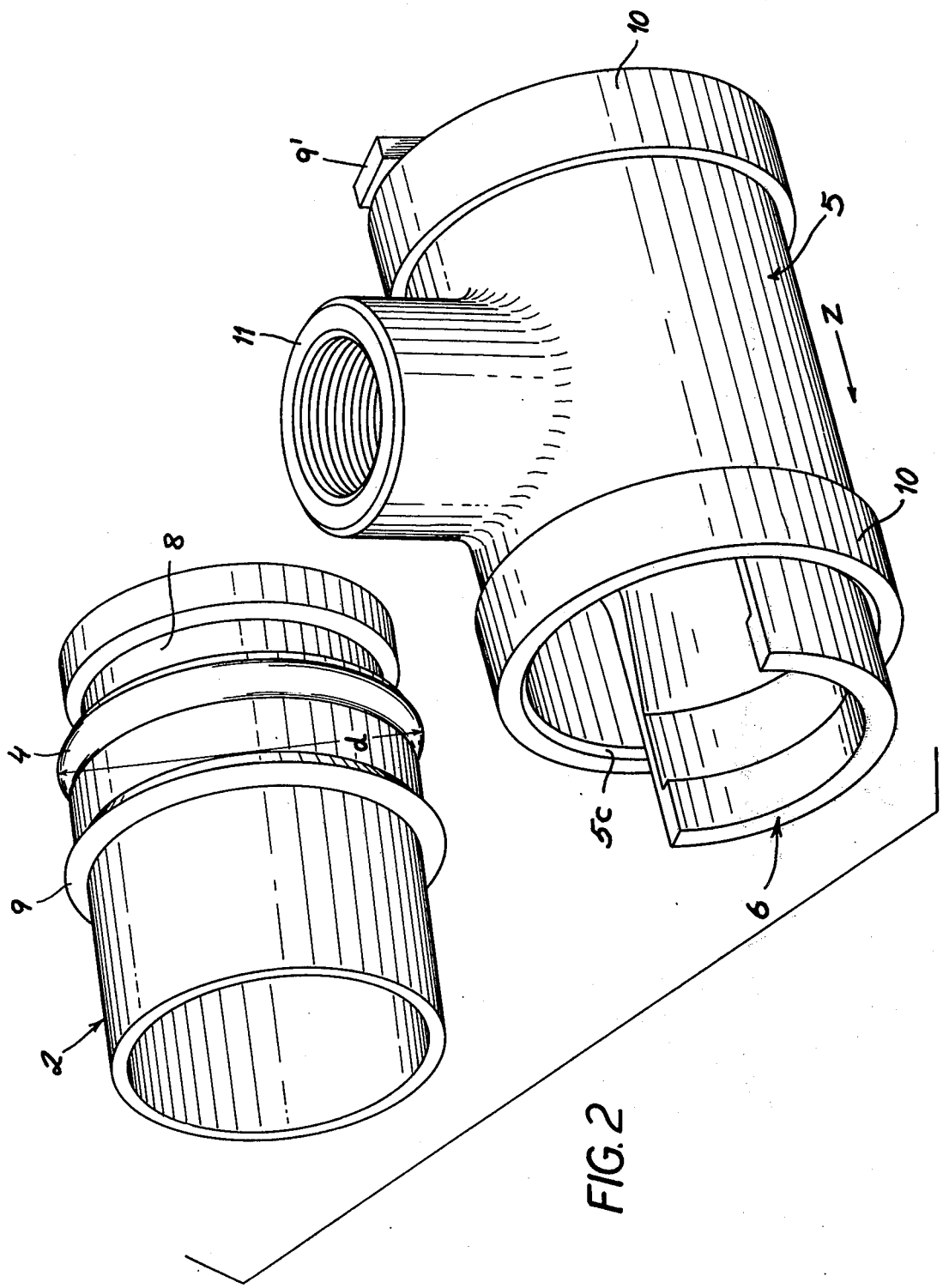
FIG. 2 is a view similar to FIG. 1 showing the retaining sleeve in place.
Figure 3:
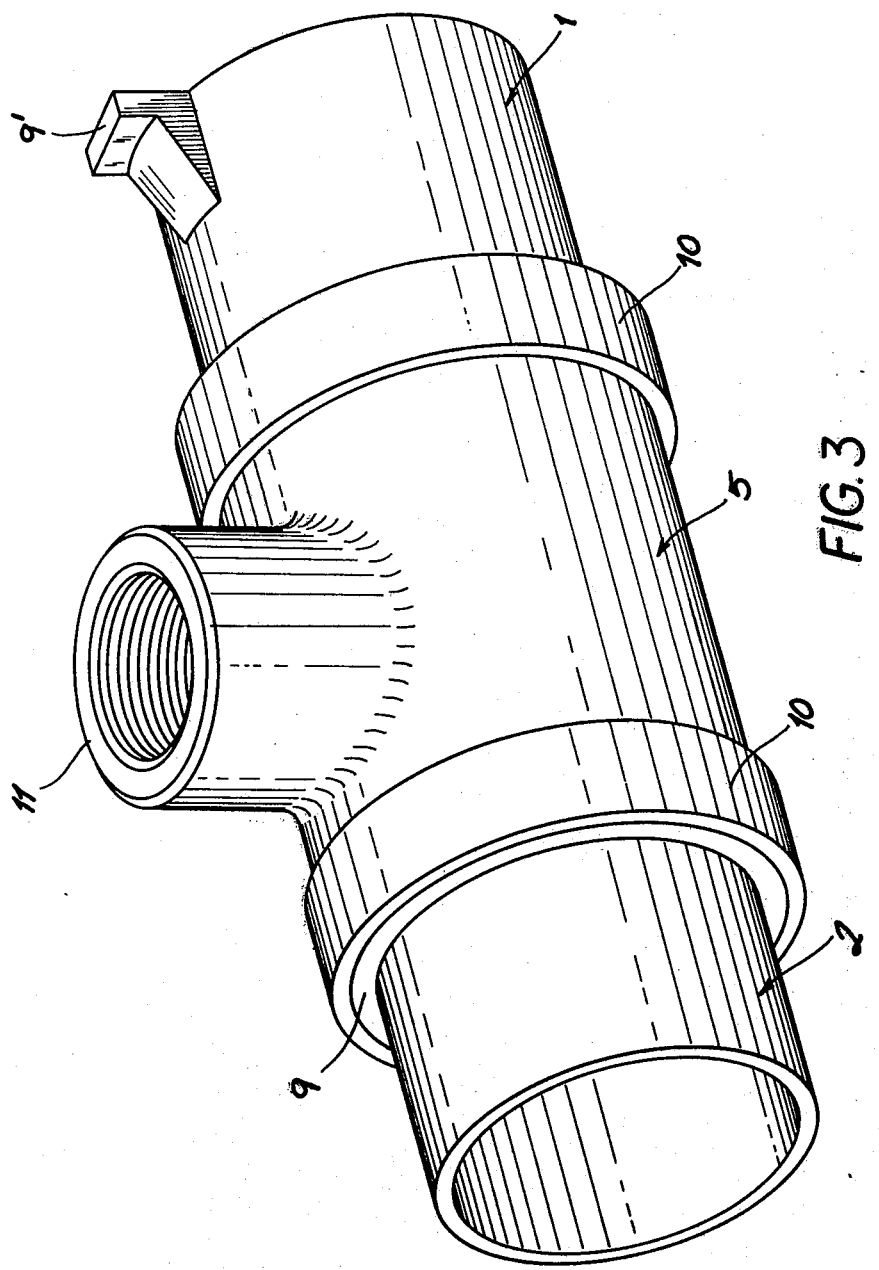
FIG. 3 is a perspective view illustrating the coupled condition of the device of FIGS. 1 and 2.
Figure 4:
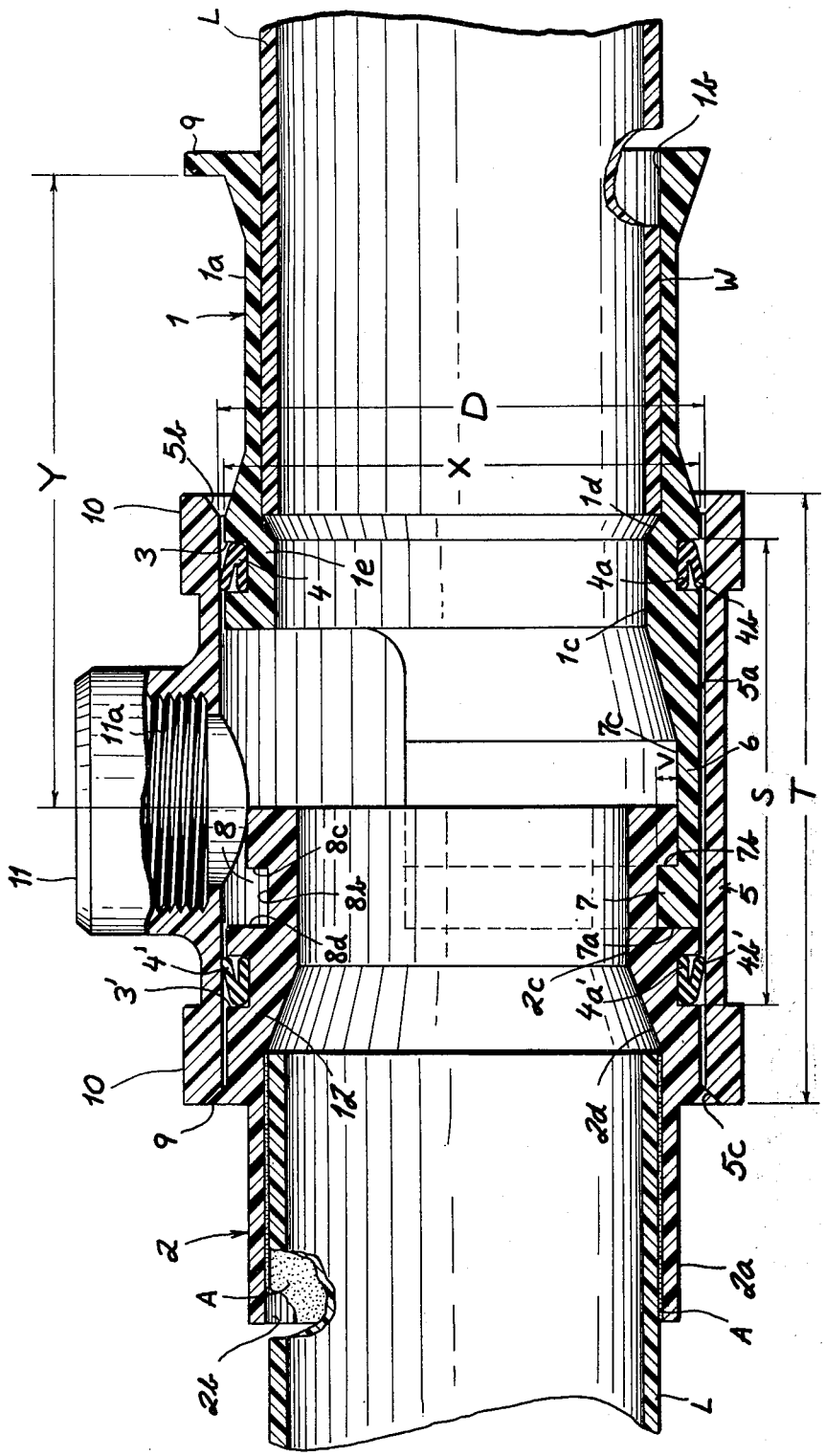
FIG. 4 is an axial cross-sectional view through the coupling.

In the drawing, I show a coupling for pipes, hose and the like represented at L and secured by a layer of adhesive A or welded at the junction W with the inner wall of a pair of cylindrical coupling members 1 and 2. The choice between adhesive or thermal welding is determined by the material. For example, of both the hose or tube and the coupling member are constituted of a thermoplastic material, ultrasonic welding or thermal welding may be used. On the other hand, when the coupling member is composed of a thermosetting material and the hose or tube of a thermoplastic, I may use an adhesive such as an epoxy resin. The coupling members 1 and 2, injection-molded from a synthetic resin, are shown to have cylindrical portions 1a and 2a with smooth cylindrical inner walls 1b and 2b to which the respective hose is secured. These cylindrical portions terminate in slight inward constrictions 1c and 2c connected to the cylindrical surfaces 1b and 2b by tapered portions 1d and 2d against which the hose or pipe L abuts. It will be apparent that one or both of the cylindrical outer surfaces of members 1a or 2a may receive the hose or pipe which can be secured thereto by a conventional hose clamp.

The coupling member 1 is provided with a thickened annular portion 1e formed with a circumferential groove 3 which is outwardly open to receive a circumferential gland-type sealing ring 4, one lip of which bears against the floor of the groove at 4a while the other lip projects outwardly at 4b with an effective diameter, in an undeflected state somewhat in excess of the diameter D of a retaining sleeve to be shifted thereover. Similarly, the enlarged portion 12, which forms a cuff or sleeve at the end of member 2, is formed with a circumferential groove 3' receiving the gland-type seal 4' whose lips 4a' and 4b' operate as described for the seal 4 but open in the opposite direction. Thus both seals open toward one another. In the coupled state of the members 1 and 2, the distance S between the seals and the grooves is less than the length T of the retaining sleeve.

The retaining sleeve is represented at 5 in FIGS. 1 – 4 and is shown as a connecting piece such that a radial boss 11 has a threaded bore 11a opening into the interior of the sleeve and adapted to receive the male threaded end of the pipe to be connected to the system. While the sleeve 5 may be extruded with a uniform cross-section throughout, I prefer to injection mold it from a synthetic resin and to provide the sleeve with circumferential beads or ridges 10 which reinforce the retaining ring approximately in the region of the seals 4 and 4'. The inner surface 5a of the sleeve is, however, smooth and of right-circular cylinder configuration with a diameter D less than the diameter d of the undeflected sealing ring (see FIG. 2) so that the sealing rings brake longitudinal movement of the sleeve and form a friction retainer against movement thereof. The interior of the sleeve 5 is flared outwardly at 5b and 5c to permit the sleeve to be fitted over the rings 4 and 4' without dislodging them. These outwardly flared portions cam the outer lips of the rings 4, 4' inwardly.

According to this invention, connecting member 1 is extended axially by a half-shell 6 of semicylindrical configuration or, in any event, with a configuration over 45° to 180° of the circumference of the cylinder and provided at its end with a form-filling coupling formation 7. The coupling formation 7 is an arcuate bead or lip of rectangular cross-section so that it presents steep flanks 7a and 7b to the engaging formation and prevents axial withdrawal of the member. The inwardly directed bead 7 is defined in part by an inwardly open recess 7c. This recess accommodates a circumferential shoulder 8a of the mating formations 8 of the coupling member 2. The shoulder 8a thus may define an outwardly open groove 8b whose steep flanks 8c and 8d abut the flanks 7a and 7b mentioned earlier. The bead 7 thus fits snugly into the annular groove 8 regardless of the angular orientation of the two members. The depth of the groove 8b is represented at V and is equal to the height of the bead 7 so that a radial or transverse movement through a distance 2V is required for separation of coupling members 1 and 2. If the diameter of the coupling members is represented at X, the diameter D < (X + 2V) and the sleeve 5 can have an internal diameter ranging between X and (X + 2V). Hence the tolerances may be relatively wide.

At its extremity remote from the coupling end, member 1 may be provided with a radially projecting abutment 9' against which the sleeve 5 can be seated in its right-hand position (FIG. 2), to permit satisfactory insertion, member 1 should be of a length such that the distance Y between the abutment and the end of member 2 in the coupling position is greater than the length T of the retaining sleeve. Member 2 may then be transversely inserted (FIG. 2) into the cradle formed by extension 6 whereupon member 5 is shifted to the left as represented by the arrow Z in FIG. 2 to lock the coupling in the position shown in FIGS. 3 and 4. Since the ring 4 frictionally engages the sleeve, the latter requires no other means for retaining it on member 1 (FIG. 2) until the coupling is assembled. A tapered ledge 9, complementary to the flared end of sleeve 5 may be provided on the member 2 to prevent excess axial movement of the sleeve 5 and may be sealed therto by an adhesive or welding if a permanent junction is desired.

It should be understood that the retaining sleeve may have various configurations, e.g. can be a T, a cross member or a simple sleeve and that a further seal may be provided at the right-hand end of the sleeve 5 to provide additional security against leakage when a permanent fit is desired. For most purposes, however, increasing fluid pressure will merely increase the tightness with which the outer lips of seals 4 and 4' engage the ring 5.

Figure 5:
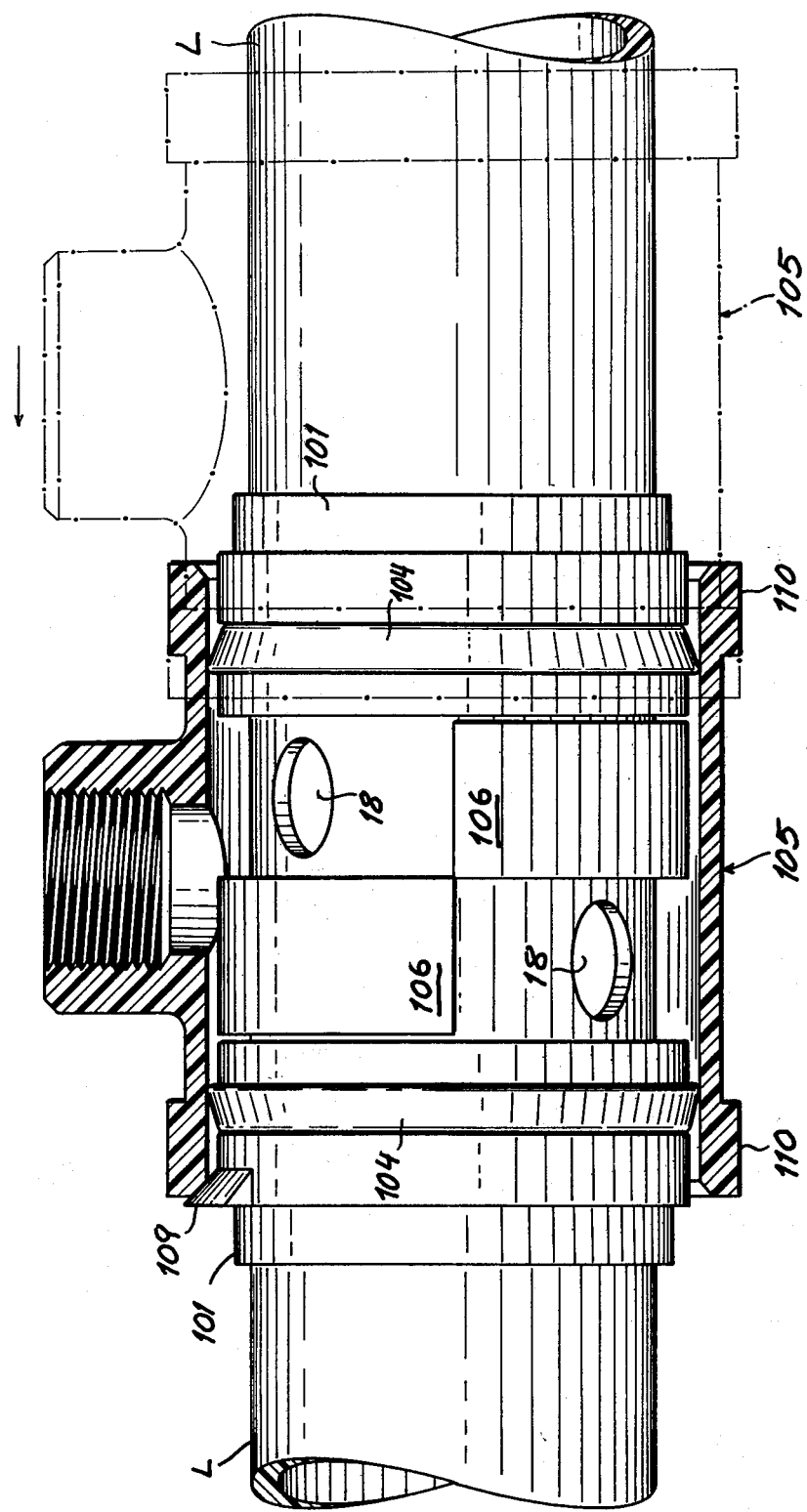
FIG. 5 is an axial cross-sectional view, partly in elevation, illustrating another embodiment of the present invention.
Figure 6:
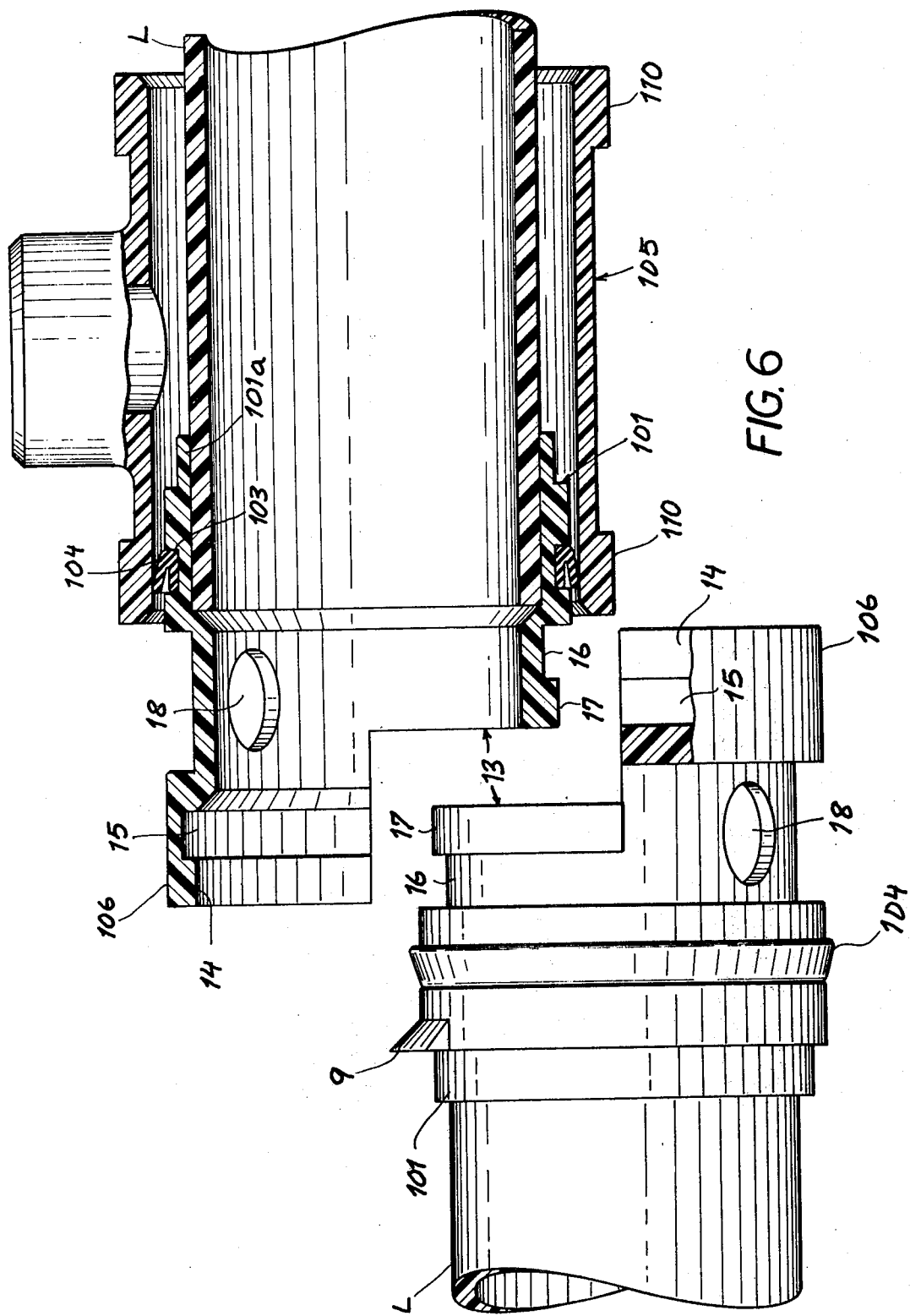
FIG. 6 is an elevational view, partly in axial section and with parts broken away, showing the latter coupling prior to connection.

In FIGS. 5 and 6, I have shown a modification which increases the resistance to tractive stress and also increases the resistance of the coupling to transverse stress. In this embodiment, coupling members 101 are provided of identical configuration but are offset angularly through 180° and extend in opposite directions toward one another so that the extensions 106 overlap. In this construction, the cylindrical portions 101a of the coupling members receive the pipe or hose L which are secured thereto by welding or adhesive as previously described. In addition, the cylindrical portions are provided with grooves 103 receiving annular seals 104 as previously described. A sleeve 105 with reinforcing beads 110 and a smooth inner surface may be mounted upon one of the coupling members prior to assembly. The coupling portions of the two members comprise semicylindrical portions 13 which are formed with outwardly projecting beads 17 adapted to be snugly received in inwardly open recesses 15 of the complementary member. Adjacent each bead 17 is a groove 16 snugly receiving a bead 14 at the end of the other member. Furthermore, bores 18 are provided in the projecting portions 106 to permit communication of fluid to the interior of the retaining sleeve 105 which, upon transverse interfitting of the coupling members, is shifted axially as represented in FIG. 5 until an abutment 109 is engaged.

In FIGS. 5 and 6, I have shown a modification which increases the resistance to tractive stress and also increases the resistance of the coupling to transverse stress. In this embodiment, coupling members 101 are provided of identical configuration but are offset angularly through 180° and extend in opposite directions toward one another so that the extensions 106 overlap. In this construction, the cylindrical portions 101a of the coupling members receive the pipe or hose L which are secured thereto by welding or adhesive as previously described. In addition, the cylindrical portions are provided with grooves 103 receiving annular seals 104 as previously described. A sleeve 105 with reinforcing beads 110 and a smooth inner surface may be mounted upon one of the coupling members prior to assembly. The coupling portions of the two members comprise semicylindrical portions 13 which are formed with outwardly projecting beads 17 adapted to be snugly received in inwardly open recesses 15 of the complementary member. Adjacent each bead 17 is a groove 16 snugly receiving a bead 14 at the end of the other member. Furthermore, bores 18 are provided in the projecting portions 106 to permit communication of fluid to the interior of the retaining sleeve 105 which, upon transverse interfitting of the coupling members, is shifted axially as represented in FIG. 5 until an abutment 109 is engaged.

I claim:

1. A coupling for pipe, tube or hose, comprising a pair of geometrically identical tubular coupling members, each of said coupling members having a circumferentially continuous cylindrical portion and a semicylinder-segmental portion with the semicylinder-segmental portions of the members being in axially overlapping relation and each reaching axially beyond the other semicylindrical-segmental portion, each semicylinder-segmental portion having at its extremity an inwardly extending arcuate shoulder receivable behind an arcuate shoulder formed at the junction between the cylindrical and semicylindrical-segmental portions of the other member, each of said segmental portions being further formed with a radially open groove adjacent its shoulder and form-fittingly receiving the shoulder of the other member at the junction between the cylindrical and semicylindrical-segmental portions thereof; each of said members being formed with a circumferentially continuous outwardly open groove on its cylindrical portion adjacent its segmental portion; a respective circumferentially continuous sealing ring received on said circumferentially continuous grooves; and a retaining sleeve axially shiftable over said member and spanning same for preventing transverse separation of said semicylindrical-segmental portions, said sealing rings sealingly engaging the interior of said sleeve, each of said coupling members having flanks lying in radial planes and abutting the flanks of the shoulder of the other member.

2. A coupling for pipe, tube or hose, comprising a pair of geometrically identical tubular coupling members, each of said coupling members having a circumferentially continuous cylindrical portion and a semicylinder-segmental portion with the semicylinder-segmental portions of the members being in axially overlapping relation, each semicylinder-segmental portion having at its extremity and inwardly extending arcuate shoulder receivable behind an arcuate shoulder formed at the junction between the cylindrical and semicylindrical-segmental portions of the other member, each of said semental portions being further formed with a radially open groove adjacent its shoulder and form-fittingly receiving the shoulder of the other member at the junction between the cylindrical and semicylindrical-segmental portions thereof; each of said members being formed with a circumferentially continuous outwardly open groove on its cylindrical portion adjacent its segmental portion; a respective circumferentially continuous sealing ring received on said circumferentially continuous grooves; and a retaining sleeve axially shiftable over said member and spanning same for preventing transverse separation of said semicylindrical-segmental portions, said sealing rings sealing engaging the interior of said sleeve, each of said coupling members having flanks lying in radial planes and abutting the flanks of the shoulder of the other members, said sleeve being provided with a tubular fitting connecting a duct to the coupling, the segmental portions of the tubular coupling members each being provided with a throughgoing radial bore.

3. The coupling defined in claim 2 wherein one of said members is formed with an abutment engaging said sleeve when the latter spans said members.

4. The coupling defined in claim 2 wherein said sleeve has a smooth inner wall conforming to a right circular cylindrical surface.

* * * * *